(12) United States Patent
Sakurai et al.

(10) Patent No.: US 8,985,873 B2
(45) Date of Patent: Mar. 24, 2015

(54) CONNECTOR COMPONENT

(71) Applicant: Sumitomo Electric Industries, Ltd., Osaka-shi (JP)

(72) Inventors: Wataru Sakurai, Yokohama (JP); Mitsuaki Tamura, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/962,123

(22) Filed: Aug. 8, 2013

(65) Prior Publication Data

US 2013/0322831 A1    Dec. 5, 2013

Related U.S. Application Data

(63) Continuation of application No. 13/092,654, filed on Apr. 22, 2011, now Pat. No. 8,646,991.

(60) Provisional application No. 61/327,966, filed on Apr. 26, 2010.

(30) Foreign Application Priority Data

| Dec. 24, 2010 | (JP) | 2010-287805 |
| Dec. 24, 2010 | (JP) | 2010-287810 |
| Dec. 24, 2010 | (JP) | 2010-287826 |

(51) Int. Cl.
 *G02B 6/42* (2006.01)
 *G02B 6/38* (2006.01)

(52) U.S. Cl.
 CPC ............ *G02B 6/4293* (2013.01); *G02B 6/3817* (2013.01); *G02B 6/4246* (2013.01)

USPC .......................................................... 385/92

(58) Field of Classification Search
 CPC ................. G02B 6/817; G02B 6/4292–6/4293
 See application file for complete search history.

(56) References Cited

U.S. PATENT DOCUMENTS

| 6,860,649 B2 | 3/2005  | Edwards et al. |
| 7,331,819 B2 | 2/2008  | Nelson et al.  |
| 7,841,904 B2 | 11/2010 | Lin et al.     |

(Continued)

FOREIGN PATENT DOCUMENTS

| CN | 101581815 A | 11/2009 |
| JP | 04-002179 A | 1/1992  |

(Continued)

OTHER PUBLICATIONS

"Universal Serial Bus 3.0 Specification, Revision 1.0", USB Implementers Forum, Inc., Nov. 12, 2008, plus ECN #001 to #009 and Errata Sheets.

(Continued)

*Primary Examiner* — Jerry Rahll
(74) *Attorney, Agent, or Firm* — Venable LLP; Michael A. Sartori; Tamatane J. Aga

(57) ABSTRACT

A connector component is provided as one compatible with conductor coupling and fiber coupling. A receptacle 1 is a connector component to be coupled to a USB connector 3 incorporating a plurality of conductor wires, and a ferrule 4 holding distal ends of optical fibers, and is provided with connections 18 to be connected to the plurality of conductor wires, a light emitting device 23 to emit light toward the ferrule 4, and a light receiving device 24 to receive light emitted from the ferrule 4.

17 Claims, 25 Drawing Sheets

(56) References Cited

U.S. PATENT DOCUMENTS

| | | |
|---|---|---|
| 2008/0232737 A1 | 9/2008 | Ishigami et al. |
| 2010/0080519 A1 | 4/2010 | Ko et al. |
| 2010/0158448 A1 | 6/2010 | Yi et al. |
| 2011/0243511 A1 | 10/2011 | Tong et al. |

FOREIGN PATENT DOCUMENTS

| | | |
|---|---|---|
| JP | 11-174269 A | 7/1999 |
| JP | 11-214100 A | 8/1999 |
| JP | 2001-168380 A | 6/2001 |
| JP | 2002-190344 A | 7/2002 |
| JP | 2008-009098 A | 1/2008 |
| JP | 2008-281746 A | 11/2008 |
| JP | 2009-508178 A | 2/2009 |
| JP | 2010-520569 T | 6/2010 |
| JP | 2011-232731 A | 11/2011 |
| JP | 2011-233500 A | 11/2011 |
| JP | 2011-233501 A | 11/2011 |
| WO | WO-2008/121731 A1 | 10/2008 |

OTHER PUBLICATIONS

Office Action in Chinese Patent Application No. 201110105819.0, dated May 28, 2014.

Notice of Reasons for Rejection in Japanese Patent Application No. 2010-287805, dated Jun. 3, 2014.

Notice of Reasons for Rejection in Japanese Patent Application No. 2010-287826, dated Jul. 29, 2014.

Notice of Reasons for Rejection in Japanese Patent Application No. 2010-287810, dated Jul. 29, 2014.

Final Rejection issued in Japanese patent Application No. 2010-287810 dated Jan. 13, 2015.

Final Rejection issued in Japanese Patent Application No. 2010-287826 dated Jan. 13, 2015.

CONNECTOR COMPONENT

CROSS-REFERENCE TO RELATED APPLICATION

This application is a Continuation of U.S. patent application Ser. No. 13/092,654, filed Apr. 22, 2011, which is a Non-provisional application based on U.S. Provisional Application No. 61/327,966, filed Apr. 26, 2010, and which claims the benefit of Japanese Patent Application Nos. 2010-287826, filed Dec. 24, 2010; 2010-287810, filed Dec. 24, 2010; and 2010-287805 filed Dec. 24, 2010, all of which are incorporated herein by reference in their entirety.

BACKGROUND OF THE INVENTION

1. Field of the Invention

The present invention relates to a connector component.

2. Related Background Art

Recently, USB (Universal Serial Bus) cables are used as serial buses for connecting peripheral devices to a computer. USB is the bus standards for connection between devices and the USB 3.0 standard is realized presently. USB 3.0 offers the currently fastest transfer rate in the USB standards and its maximum transfer rate is 5 Gbit/s (e.g., Universal Serial Bus 3.0 Specification Revision 1.0).

SUMMARY OF THE INVENTION

As described above, transfer of large-volume data is required in the recent communication fields. There is, however, a limit to communication rates through conductor wires like USB 3.0 described above. For further increase in transfer rate, there is thus a proposal of a USB cable adapted for optical coupling while including optical cords, in addition to the conductor coupling (Published Japanese Translation of PCT International Application No. P2010-520569A). For that, the computers and other devices need to be equipped with a connector component compatible with both of the conductor coupling and optical coupling.

The present invention has been accomplished in order to solve the problem as described above, and it is an object of the present invention to provide a connector component compatible with the conductor coupling and fiber coupling.

In order to solve the above problem, a connector component according to the present invention is a connector component to be coupled to a connector incorporating a plurality of conductor wires, and a ferrule holding distal ends of optical fibers, the connector component comprising: connections to be connected to the plurality of conductor wires; a light emitting device to emit light toward the ferrule; and a light receiving device to receive light emitted from the ferrule, wherein the plurality of conductor wires are connected by conductor coupling to the connections and wherein the optical fibers are connected by optical coupling to the light emitting device and the light receiving device.

This connector component comprises the connections to be connected to the conductor wires, the light emitting device to emit light toward the ferrule, and the light receiving device to receive light emitted from the ferrule, the plurality of conductor wires are connected by conductor coupling to the connections, and the optical fibers are connected by optical coupling to the light emitting device and the light receiving device. This allows the connector component to be compatible with the USB cable adapted for the optical coupling while including optical cords, in addition to the conductor coupling. As a consequence, it becomes feasible to achieve large-volume data communication at high speed.

The connector component comprises lenses for collimating light, at positions opposite to the light emitting device and the light receiving device. This configuration ensures surer optical coupling because the lenses collimate the light emitted from the light emitting device and the light received by the light receiving device.

Preferably, the connector component comprises a mirror for reflecting light, at a position opposite to the lenses, and the mirror reflects the light emitted from the light emitting device and collimated by the lens, toward the ferrule and reflects the light emitted from the ferrule, toward the light receiving device. This configuration enables optical coupling to the optical cords of the USB cable, without need for locating the light emitting device and the light receiving device at positions opposite to the ferrule. For this reason, the locations of the light emitting device and the light receiving device can be optionally set.

Preferably, the connector component comprises a lens case with a receiving portion forming a receiving space to receive the light emitting device and the light receiving device, and the lenses are provided at the positions opposite to the light emitting device and the light receiving device on the lens case. This configuration permits the light emitting device and the light receiving device to be protected by the lens case.

The light emitting device and the light receiving device are arranged at respective positions opposite to the ferrule. This ensures good optical coupling of the optical fibers with the light emitting device and the light receiving device.

Preferably, the connector component comprises lenses for collimating light, between the light emitting device and the ferrule and between the light receiving device and the ferrule. This configuration ensures surer optical coupling because the lenses collimate the light emitted from the light emitting device and the light received by the light receiving device.

Preferably, the connector component comprises a lens case with a receiving portion to receive the light emitting device and the light receiving device, and the lenses are provided between the light emitting device and the ferrule and between the light receiving device and the ferrule on the lens case. This configuration permits the light emitting device and the light receiving device to be protected by the lens case.

Preferably, the connector component comprises a lens case on which the light emitting device and the light receiving device are mounted, and the lenses are provided between the light emitting device and the ferrule and between the light receiving device and the ferrule on the lens case. This configuration permits the light emitting device and the light receiving device to be protected by the lens case.

The connector component comprises a conductive member to which the light emitting device and the light receiving device are connected and which is embedded in the lens case, and a connection member to be electrically connected to a printed circuit board is connected to the conductive member. This configuration permits downsizing of the component because there is no need for providing any substrate for mounting of the light emitting device and the light receiving device.

The connector component comprises a substrate on which the light emitting device and the light receiving device are mounted, and a conductive member to be electrically connected to a printed circuit board is connected to the substrate. This configuration enables good connection between the printed circuit board and the substrate.

The connector component comprises a substrate on which the light emitting device and the light receiving device are mounted, and the substrate has a connection portion to which the connections to be electrically connected to the conductor wires are connected and which is to be connected directly to a printed circuit board. This configuration permits the substrate to be directly connected to an edge connector socket mounted on the printed circuit board. For this reason, fast transmission becomes feasible.

Preferably, the lens case is provided with a guide pin to be inserted into the connector and to implement optical-axis alignment of the light emitting device and the light receiving device with the ferrule. This configuration enables good optical-axis alignment of the light emitting device and the light receiving device with the ferrule and improvement in accuracy of optical coupling.

DESCRIPTION OF THE PREFERRED EMBODIMENTS

Figure 1:
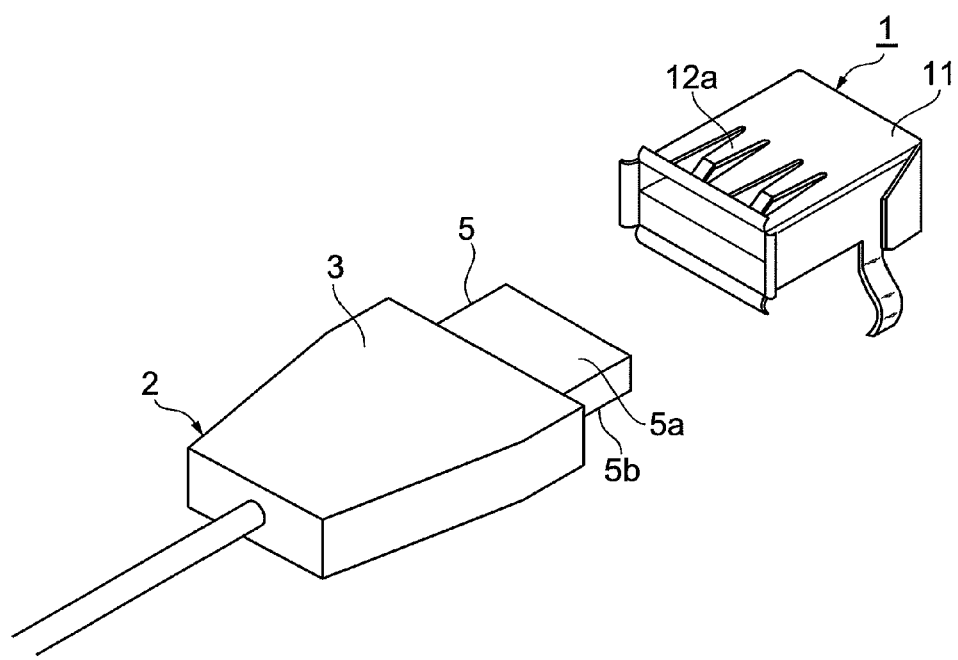
FIG. 1 is a perspective view showing a receptacle and a USB cable according to the first embodiment.

The preferred embodiments of the connector component according to the present invention will be described below with reference to the accompanying drawings. In the below description, the same elements or elements with the same functionality will be denoted by the same reference signs, without redundant description. In the description hereinafter, "front" represents the left side in the drawing and "rear" the right side in the drawing.

[First Embodiment]

Figure 2:
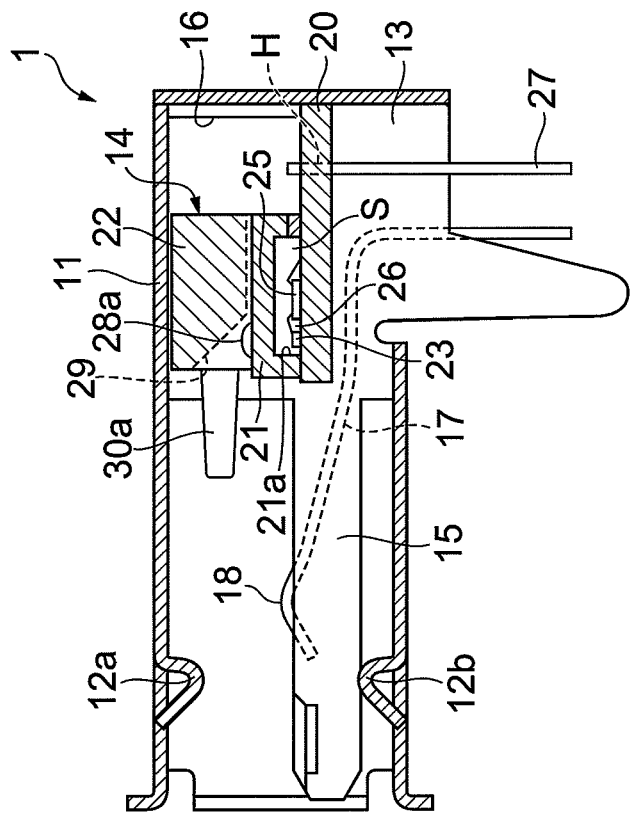
FIG. 2 is a side cross-sectional view of the receptacle and USB connector shown in FIG. 1.
Figure 2:
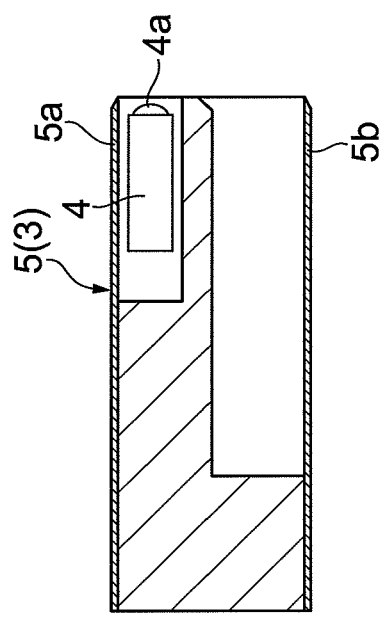
Figure 3:
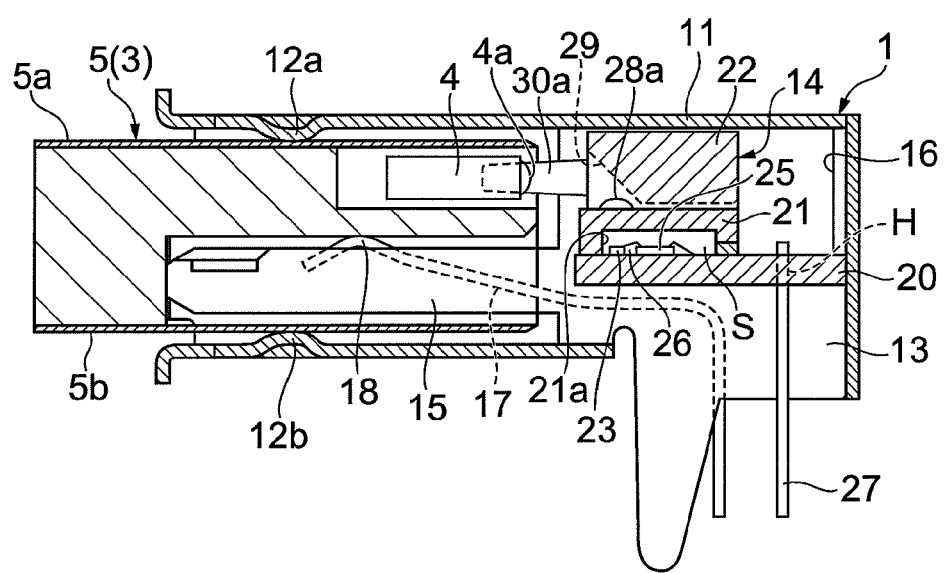
FIG. 3 is a side cross-sectional view showing a state in which the receptacle and the USB connector shown in FIG. 2 are coupled.

FIG. 1 is a perspective view showing a receptacle and a USB connector according to the first embodiment. FIG. 2 is a side cross-sectional view in FIG. 1. FIG. 3 is a side cross-sectional view showing a state in which the USB connector is coupled to the receptacle.

As shown in FIG. 1, the receptacle 1 is a connector component to which the USB connector 3 with USB A terminal connected to a USB (Universal Serial Bus) cable 2 is to be coupled. A plurality of optical cords (two optical cords herein), in addition to a plurality of conductor wires (four wires herein; metal lines), are shielded in the USB cable 2. As shown in FIG. 2, a ferrule 4 is housed in a plug 5 of the USB connector 3 and this ferrule 4 holds distal ends of coated optical fibers (not shown) of the respective optical cords. Lenses 4a are located at a tip end of the ferrule 4 and a center axis of each lens 4a is highly accurately aligned with a center axis of a corresponding coated optical fiber. The receptacle 1 is mounted, for example, on a personal computer or on other external equipment (e.g., a printer, an external hard disk drive, or the like).

As shown in FIG. 3, the receptacle 1 and the USB connector 3 are connected in such a manner that the USB connector 3 is nipped by the receptacle 1. Specifically, the receptacle 1 is provided with a metal shell 11 and the metal shell 11 is equipped with a pair of projections 12a, 12b projecting inwardly, in the vertical directions (opposite directions) in the drawing. In this configuration, as the USB connector 3 is plugged into the receptacle 1, a top face 5a and a bottom face 5b of the plug 5 of the USB connector 3 come into contact with the projections 12a, 12b. This causes the projections 12a, 12b to push the top face 5a and bottom face 5b of the plug 5 of the USB connector 3, whereby the receptacle 1 and the USB connector 3 are retained in a connected state. The receptacle 1 is optically coupled with the USB connector 3 through alignment of their optical axes by guide pins 30a, 30b described below. At the same time as the optical coupling, the conductor wires of the USB connector 3 are also coupled (in metal contact) with connections 18 of the receptacle 1.

Figure 4:
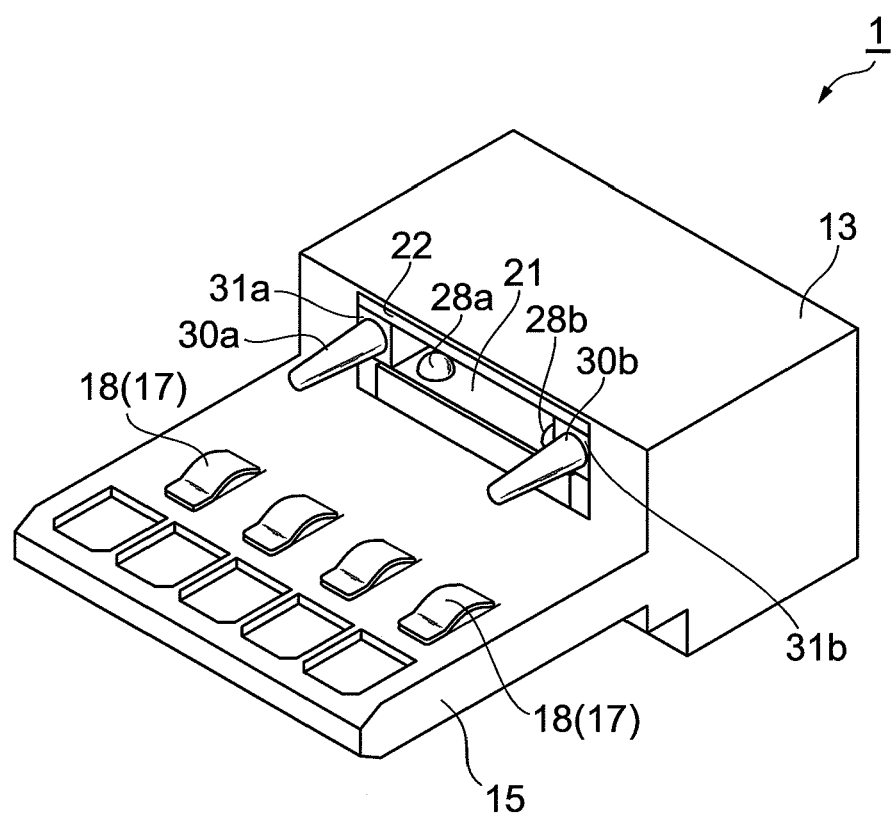
FIG. 4 is a perspective view of the receptacle shown in FIG. 1.
Figure 5:
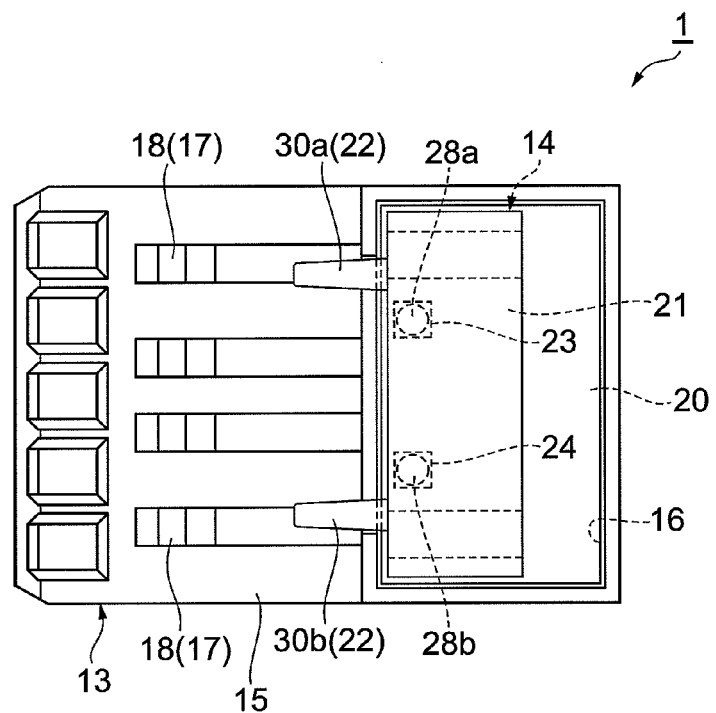
FIG. 5 is a top plan view of the receptacle shown in FIG. 4.
Figure 6:
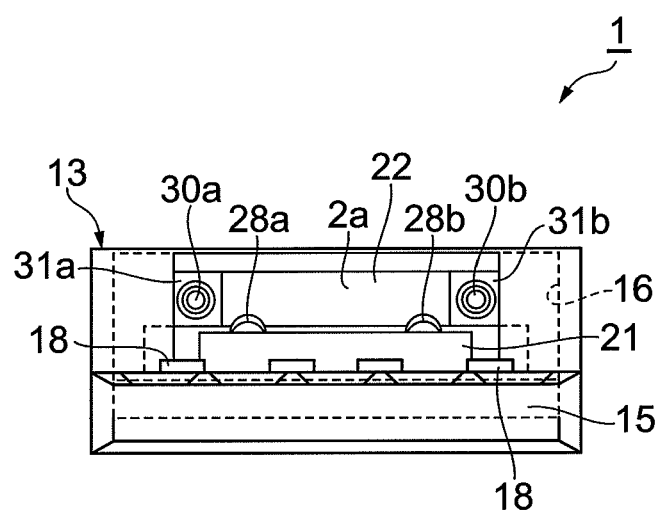
FIG. 6 is a front view of the receptacle shown in FIG. 4.
Figure 7:
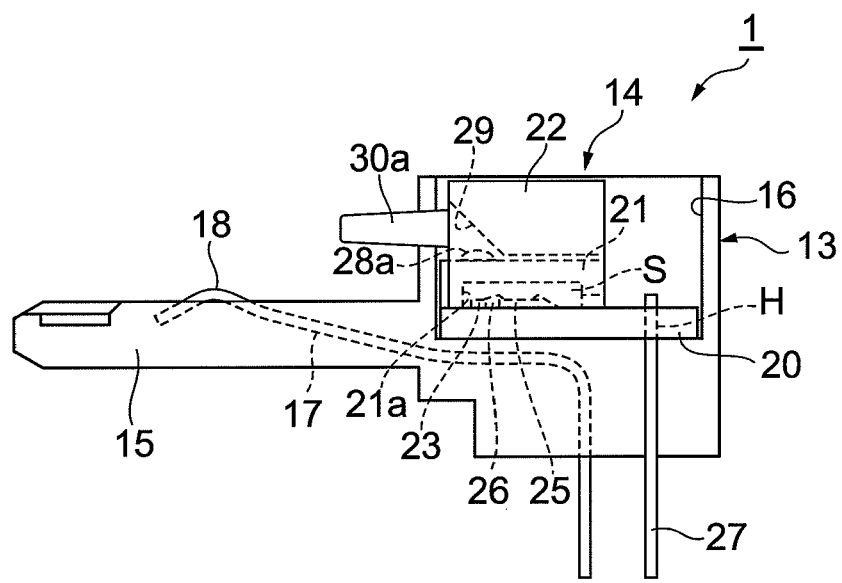
FIG. 7 is a side view of the receptacle shown in FIG. 4.
Figure 8:
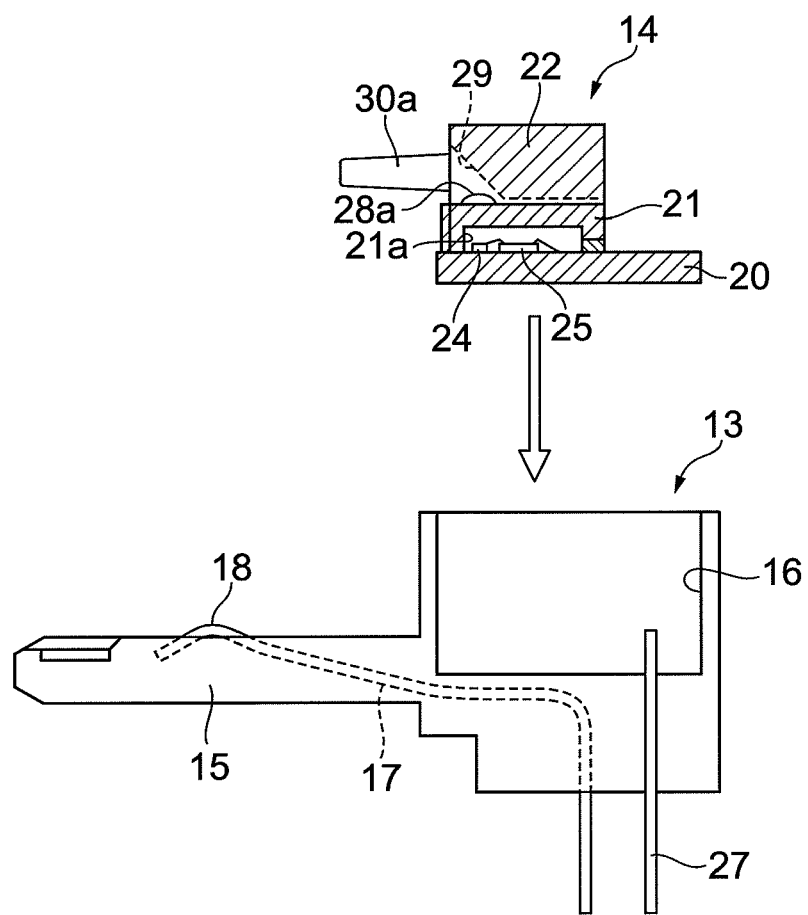
FIG. 8 is a drawing for explaining an assembling procedure of the receptacle shown in FIG. 4.

The configuration of the receptacle 1 will be described below with reference to FIGS. 4 to 8. FIG. 4 is a perspective view showing the appearance of the receptacle, FIG. 5 is a top plan view of the receptacle shown in FIG. 4, FIG. 6 is a front view of the receptacle shown in FIG. 4, FIG. 7 is a side view of the receptacle shown in FIG. 4, and FIG. 8 is a drawing for explaining an assembling procedure of the receptacle shown in FIG. 4. FIGS. 4 to 8 are drawn without illustration of the metal shell 11, for convenience' sake of description.

As shown in each drawing, the receptacle 1 is provided with a main body part 13 and an optical device part (OSA: Optical Sub Assembly) 14. The main body part 13 is made of an insulating material. The main body part 13 has a protruding portion 15 and a housing portion 16. The protruding portion 15 is provided so as to protrude forward from the housing portion 16 in the main body part 13, and is of a flat plate shape. In the protruding portion 15 there are a plurality of embedded conductors (four conductors herein; connection conductors) 17 for electric signals, power, and power ground. As shown in FIG. 7, one ends of the conductors 17 are provided so as to be exposed in a surface of the protruding portion 15 at positions where they are electrically connected to contact portions (not shown) provided in the USB connector 3, thereby constituting the connections 18. The other ends of the conductors 17 are bent at about 90° on the rear side (housing portion 16 side) of the main body part 13 to be drawn out downward from the main body part 13. The housing portion 16 is provided on the rear side of the main body part 13. The housing portion 16 is a portion that houses the optical device part 14, and has a rectangular shape on the top plan view, as shown in FIG. 5.

The optical device part 14 is composed of a substrate 20, a lens case 21, and a mirror component 22. The substrate 20 is, for example, a printed wiring board. The substrate 20 has a rectangular shape and has the outside dimensions equivalent to those of the housing portion 16 in the main body part 13. There are a light emitting device 23, a light receiving device 24, and an IC (Integrated Circuit) chip 25 mounted on the front end side of the substrate 20. The light emitting device 23 and the light receiving device 24 are connected through wires 26 to the IC chip 25. The light emitting device 23 to be used herein can be, for example, a vertical cavity surface emitting laser (VCSEL: Vertical Cavity Surface Emitting LASER). The light receiving device 24 to be used herein can be a photodiode (PD: Photodiode).

The IC chip 25 has functions to control the light emitting device 23 and the light receiving device 24 and other functions, e.g., such functions as a driver to drive the light emitting device 23, a transimpedance amplifier (TIA: TransImpedance Amplifier) to output a voltage signal according to a light signal received by the light receiving device 24, a limiting amplifier (LA: Limiting Amplifier), and so on. The IC chip 25 is controlled by the device on which the receptacle 1 is mounted.

There are through holes H formed on the rear end side of the substrate 20, through which terminals (pins: electroconductive members) 27 for connection between the optical device part 14 and a printed circuit board (not shown) are inserted. There are a plurality of through holes (e.g., nine holes) H formed corresponding to the terminals 27, and the through holes H are electrically connected to the terminals 27. The terminals 27 inserted in the through holes H are as many (e.g., nine terminals) as the through holes H, in the main body part 13. Specifically, the terminals 27 include, for example, four terminals for signal lines, one terminal for power, one terminal for ground (earth), and three terminals for control of the IC chip 25. The terminals 27 are inserted in the through holes H formed in the substrate 20, so as to be electrically connected to the substrate 20. In the example of FIG. 7 the terminals 27 connected to the substrate 20 are aligned in a line in the direction normal to the plane of the drawing, but they may be aligned in a plurality of lines in the direction normal to the plane of the drawing.

The lens case 21 is arranged on the substrate 20 so as to cover the light emitting device 23, the light receiving device 24, the IC chip 25, and so on. The lens case 21 is made of a transparent resin with transparency, e.g., polyetherimide (PEI), polycarbonate (PC), or acrylic resin. Furthermore, it is preferable to use an electron beam cross-linked resin. When the electron beam cross-linked resin is used, the lens case 21 can have sufficient reflow heat resistance and then can be mounted simultaneously with general electronic components. The lens case 21 has a recessed cross section and has a receiving portion 21a forming a receiving space S to receive the light emitting device 23, the light receiving device 24, the IC chip 25, etc. in a state in which it is arranged on the substrate 20. A lens portion 28a for collimating light to be emitted from the light emitting device 23 is formed in a spherical convex shape on a top face of the lens case 21 (the surface on the mirror 29 side) and at a position opposite to the light emitting device 23. Furthermore, a lens portion 28b for collimating light to enter the light receiving device 24 is formed in a spherical convex shape on the top face of the lens case 21 and at a position opposite to the light receiving device 24. The lens portion 28a and the lens portion 28b are arranged on the same straight line, in the width direction of the main body part 13. Each of the lens portion 28a and the lens portion 28b is adaptable to either of the light emitting device 23 and the light receiving device 24. The positions of the light emitting device 23 and the light receiving device 24 may be properly changed according to specifications.

The receiving space S (receiving portion 21a) of the lens case 21 is filled with a refractive-index matching material (resin) not shown. The refractive-index matching material to be used herein can be, for example, epoxy resin, silicone resin, or the like, and the refractive index thereof is, for example, $n=1.4$ to $1.6$ approximately. When the receiving space S of the lens case 21 is filled with the refractive-index matching material, it is feasible to reduce reflection of incident and emerging light at an interface with air and to protect the light emitting device 23, light receiving device 24, IC chip 25, etc. arranged on the substrate 20.

The mirror component 22 is arranged on the substrate 20 so as to be located above the lens case 21. The mirror component 22 has a mirror 29, and guide pins 30a, 30b. The mirror 29 is provided at a position where it is opposed to the lens portions 28a, 28b of the lens case 21 (or where the lens portions 28a, 28b face the mirror 29). The mirror 29 is arranged at such an angle (e.g.,) 45° as to reflect light by 90° relative to an incidence direction or an emergence direction and is formed along the width direction (the vertical direction in FIG. 5) of the mirror component 22.

The guide pins 30a, 30b, as shown in FIG. 4, are formed on a pair of stands 31a, 31b, respectively, provided on both sides in the width direction of the main body part 13. The guide pins 30a, 30b are provided so as to project forward from a front face of the mirror component 22 (a surface on the side where the USB connector 3 is located). Specifically, the guide pins 30a, 30b are formed so as to be tapered from the base end on the stand 31a, 31b side toward the distal end. The guide pins 30a, 30b are inserted into guide grooves (not shown) formed in the plug 5 of the USB connector 3. The guide pins 30a, 30b are molded integrally with the mirror 29.

The receptacle 1 having the above-described configuration is constructed, as shown in FIG. 8, by first assembling the optical device part 14 and thereafter incorporating this optical device part 14 into the housing portion 16 of the main body part 13. On this occasion, the optical device part 14 is arranged in the housing portion 16 of the main body part 13 by such positioning that the terminals 27 formed in the main body part 13 are inserted into the through holes H formed in the substrate 20 of the optical device part 14. Then the main body part 13 with the optical device part 14 thereon is inserted into the metal shell 11, thereby completing the receptacle 1.

The below will describe the operation with the aforementioned receptacle 1 and the USB connector 3 being coupled, with reference to FIG. 3. In FIG. 3, the conductor wires of the USB cable 2 are in contact with the connections 18 of the receptacle 1, thereby achieving connections (metal contacts) between the conductors. For example, output light from the light emitting device 23 of the receptacle 1 is collimated by the lens portion 28a of the lens case 21 (to become collimated light), and then the light is reflected by the mirror 29 of the mirror component 22 to change its traveling direction by 90°. Then the reflected light is incident into the lens 4a of the ferrule 4.

On the other hand, output light from the ferrule 4 is also reflected similarly by the mirror 29 of the mirror component 22 to change its traveling direction by 90° and then the reflected light is condensed by the lens portion 28b of the lens case 21 to enter the light receiving device 24. In this manner, the optical coupling is also achieved at the same time as the conductor coupling.

The receptacle 1 having the aforementioned configuration is provided with a shutter (not shown) to cover the plug portion of the USB connector 3 in a state in which it is mounted on a personal computer or the like. This is the configuration for preventing the emission from the light emitting device 23 from being directly seen by users. This configuration ensures safety for user's eyes. Alternatively, the IC chip 25 may control the light emitting device 23 to emit light only if the receptacle 1 is connected to the USB connector 3.

As described above, the receptacle 1 is provided with the connections 18 to be connected to the conductor wires of the USB cable 2, the light emitting device 23 to emit light toward the ferrule 4, and the light receiving device 24 to receive light emitted from the ferrule 4.

Then the conductor wires are connected by conductor coupling to the connections 18 and the optical fibers in the USB cable 2 are connected by optical coupling to the light emitting device 23 and the light receiving device 24. This allows the receptacle 1 to be compatible with the USB cable 2 adapted for the optical coupling while including the optical cords, in addition to the conductor coupling. As a result, it becomes feasible to achieve large-volume data communication at high speed.

Since the lens portions 28a, 28b for collimating light are provided at the positions opposite to the light emitting device 23 and the light receiving device 24, the light beam emitted from the light emitting device 23 and the light beam received by the light receiving device 24 are collimated by the lens portions 28a, 28b, which ensures surer optical coupling.

Furthermore, the mirror 29 for reflecting light is provided at the position opposite to the lens portions 28a, 28b, and the mirror 29 reflects the light emitted from the light emitting device 23 and collimated by the lens portion 28a, toward the ferrule 4 and reflects the light emitted from the ferrule 4, toward the light receiving device 24. This enables the optical coupling with the optical cords of the USB cable 2, without need for locating the light emitting device 23 and the light receiving device 24 at positions opposite to the ferrule 4. For this reason, the locations of the light emitting device 23 and the light receiving device 24 can be optionally set.

The receptacle 1 is provided with the lens case 21 having the receiving portion 21a which forms the receiving space S to receive the light emitting device 23 and the light receiving device 24, and the lens portions 28a, 28b are provided at the positions opposite to the light emitting device 23 and the light receiving device 24 on the lens case 21. This configuration allows the light emitting device 23 and the light receiving device 24 to be protected by the lens case 21. Furthermore, since the receiving space S is filled with the refractive-index matching material, it can reduce reflection of incident and emerging light at the interface to air and protect the light emitting device 23, light receiving device 24, IC chip 25, etc. arranged on the substrate 20, more certainly.

[Second Embodiment]

Figure 9:
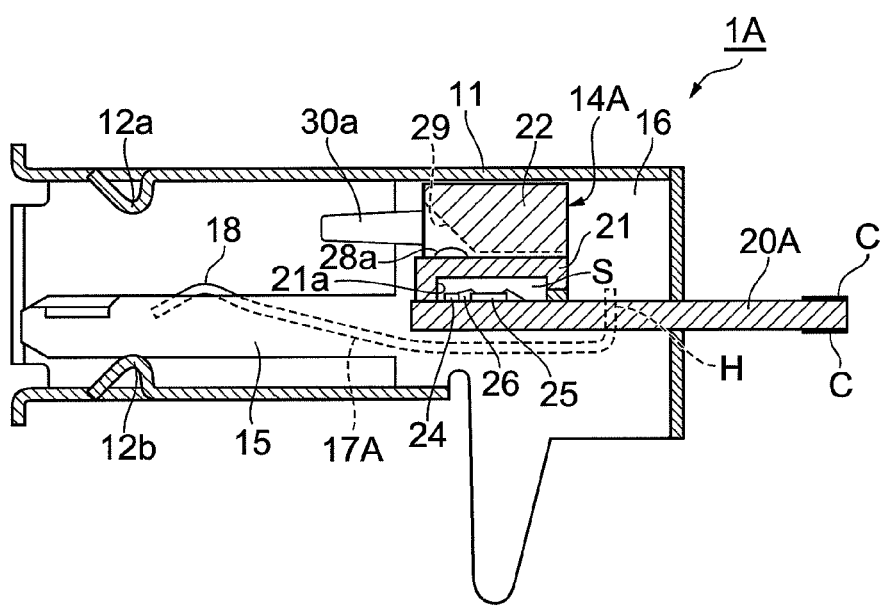
FIG. 9 is a side cross-sectional view of a receptacle according to the second embodiment.

The second embodiment will be described below. FIG. 9 is a side cross-sectional view of the receptacle according to the second embodiment. As shown in FIG. 9, the receptacle 1A of the second embodiment is provided with a main body part 13 and an optical device part 14A. The main body part 13 has the same configuration as in the first embodiment.

The optical device part 14A is composed of a substrate 20A, a lens case 21, and a mirror component 22, and the lens case 21 and the mirror component 22 have the same configurations as in the first embodiment. There are a light emitting device 23, a light receiving device 24, and an IC chip 25 mounted on the front end side of the substrate 20A. The substrate 20A has a larger length than the substrate 20 in the first embodiment, and the rear end of the substrate 20A projects out of the metal shell 11. Contacts (connections) C to be inserted into an edge connector socket (not shown) are formed at the end on the rear end side of the substrate 20A. In this configuration, the substrate 20A serves as an edge connector.

Furthermore, conductors 17A are bent by approximately 90° upward on the rear end side of the main body part 13 and inserted into respective through holes H formed in the substrate 20A. In the receptacle 1A, therefore, terminals to be connected to a printed circuit board are only the contacts C of the substrate 20A.

As described above, the receptacle 1A is provided with the connections 18 to be connected to the conductor wires of the USB cable 2, the light emitting device 23 to emit light toward the ferrule 4, and the light receiving device 24 to receive light emitted from the ferrule 4. Then the conductor wires are connected by conductor coupling to the connections 18 and the optical fibers in the USB cable 2 are connected by optical coupling to the light emitting device 23 and the light receiving device 24. This allows the receptacle 1A to be compatible with the USB cable 2 adapted for the optical coupling while including the optical cords, in addition to the conductor coupling. As a consequence, it becomes feasible to achieve large-capacity data communication at high speed.

Since in the receptacle 1A the substrate 20A is the edge connector with the contacts C to be inserted into the edge connector socket, faster transmission can be achieved when compared with the case where the connection to the printed circuit board is implemented by the conductors 17 and terminals (pins).

[Third Embodiment]

Figure 10:
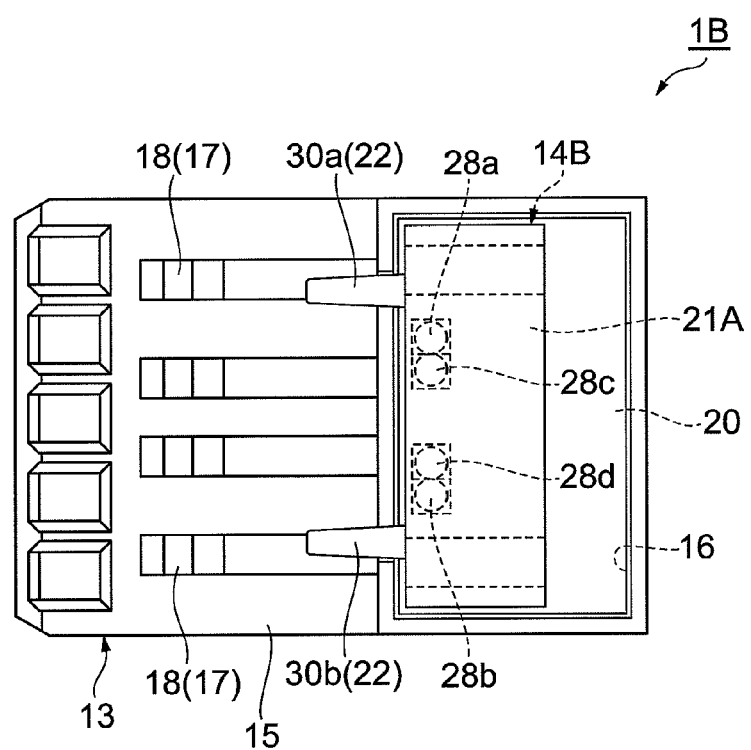
FIG. 10 is a top plan view of a receptacle according to the third embodiment.

The third embodiment will be described below. FIG. 10 is a top plan view showing the receptacle of the third embodiment. As shown in FIG. 10, the receptacle 1B of the third embodiment is different from the receptacle 1 of the first embodiment in that it is further provided with lens portions 28c, 28d, but the other basic configuration is the same as in the first embodiment.

An optical device part 14B of the receptacle 1B is provided with a plurality of lens portions (four lens portions herein) 28a-28d. Specifically, the lens portions 28a-28d are arranged along the longitudinal direction of the lens case 21A. The lens portions 28a-28d are formed in a spherical convex shape, at positions opposite to light emitting devices 23 and light receiving devices 24 and on the top face of the lens case 21A (the surface on the mirror 29 side), as in the first embodiment. Namely, there are two light emitting devices 23 and two light receiving devices 24 mounted on the substrate 20.

As described above, the receptacle 1B is provided with the connections 18 to be connected to the conductor wires of the USB cable 2, the light emitting devices 23 to emit light toward the ferrule 4, and the light receiving devices 24 to receive light emitted from the ferrule 4. Then the conductor wires are connected by conductor coupling to the connections 18 and the optical fibers in the USB cable 2 are connected by optical coupling to the light emitting devices 23 and the light receiving devices 24. This allows the receptacle 1B to be compatible with the USB cable 2 adapted for the optical coupling while including the optical cords, in addition to the conductor coupling. As a result, it becomes feasible to achieve large-volume data communication at high speed.

The configuration with the lens portions 28a-28d allows the receptacle 1B to be compatible with the case where the USB cable 2 includes four optical cords. It is noted that the configuration of the receptacle 1B of the third embodiment is also applicable to the receptacle 1A of the second embodiment.

[Fourth Embodiment]

Figure 11:
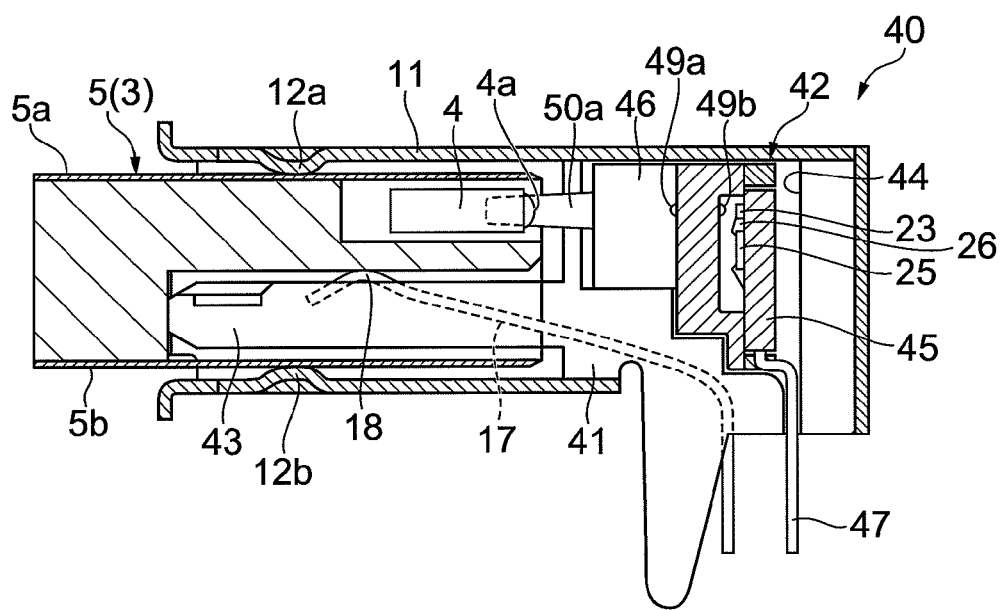
FIG. 11 is a side cross-sectional view showing a state in which a receptacle and a USB connector according to the fourth embodiment are coupled.
Figure 12:
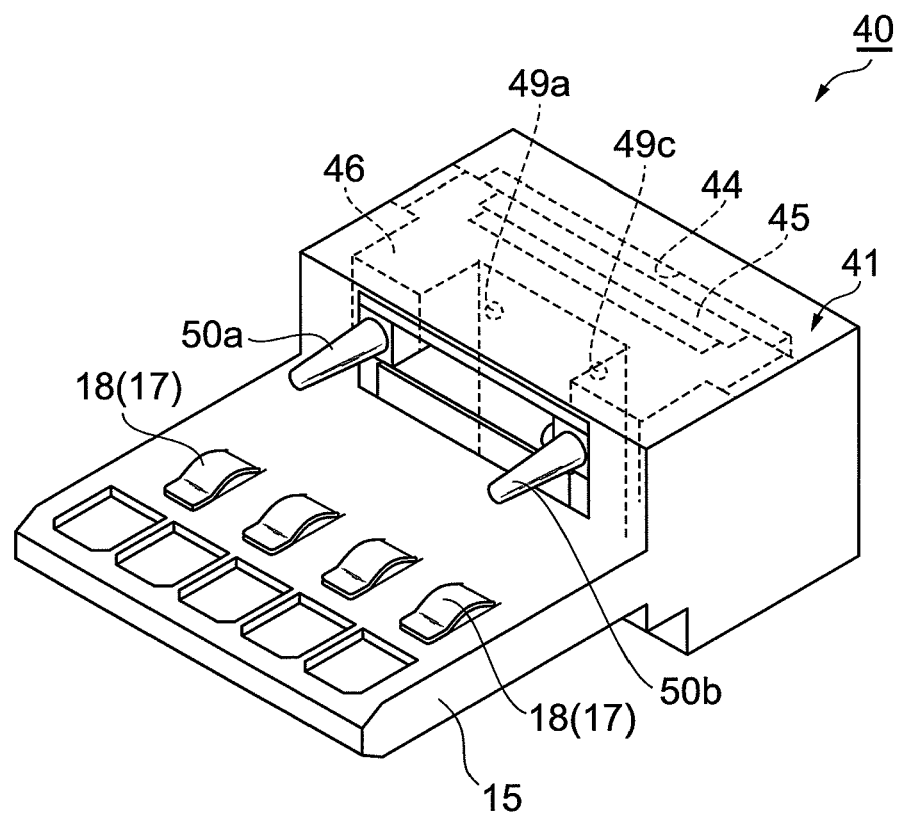
FIG. 12 is a perspective view of the receptacle shown in FIG. 11.
Figure 13:
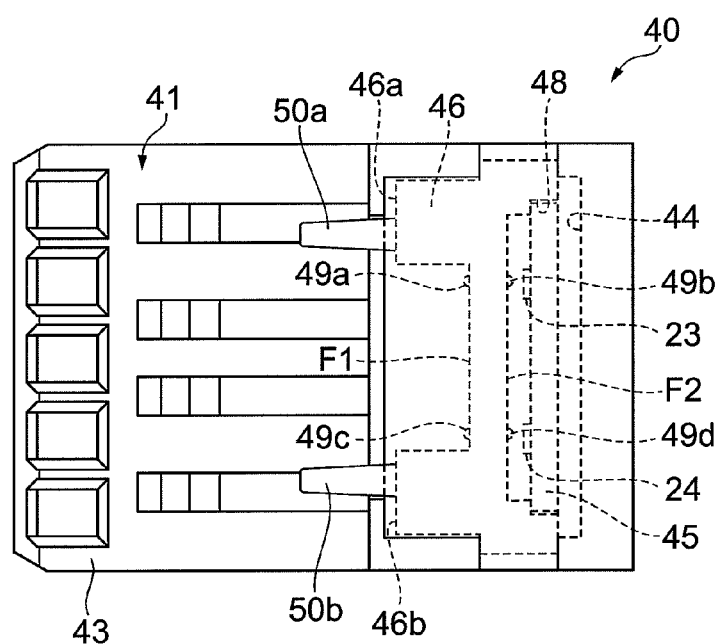
FIG. 13 is a top plan view of the receptacle shown in FIG. 11.
Figure 14:
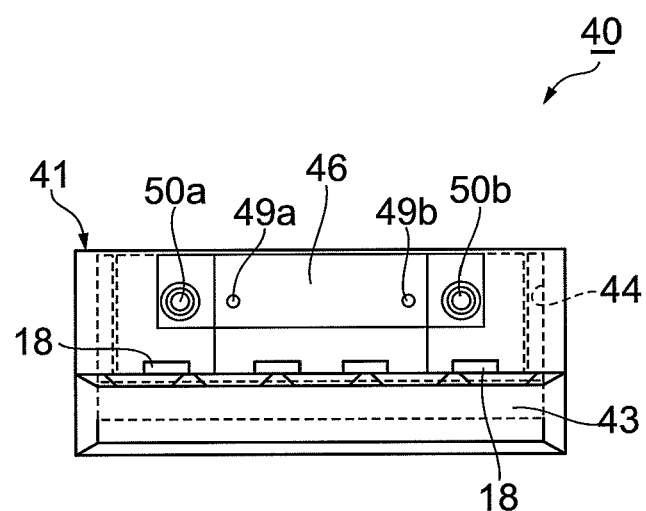
FIG. 14 is a front view of the receptacle shown in FIG. 11.
Figure 15:
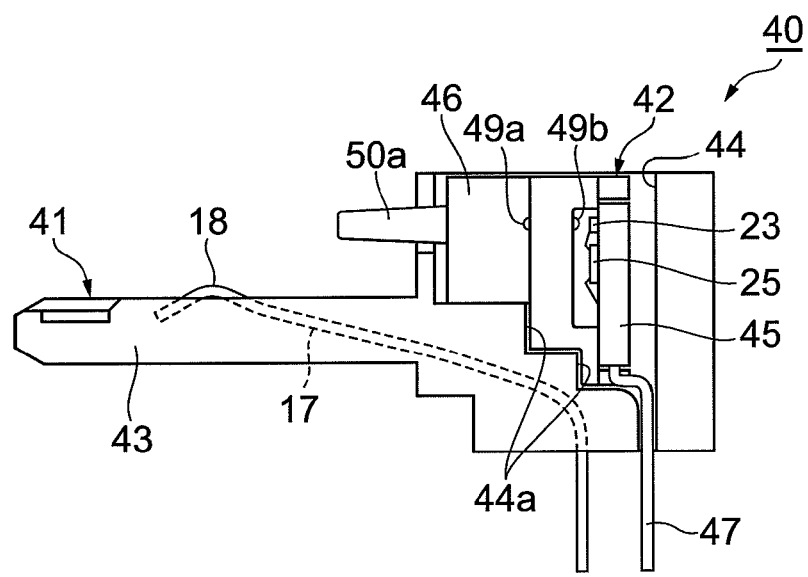
FIG. 15 is a side view of the receptacle shown in FIG. 11.
Figure 16:
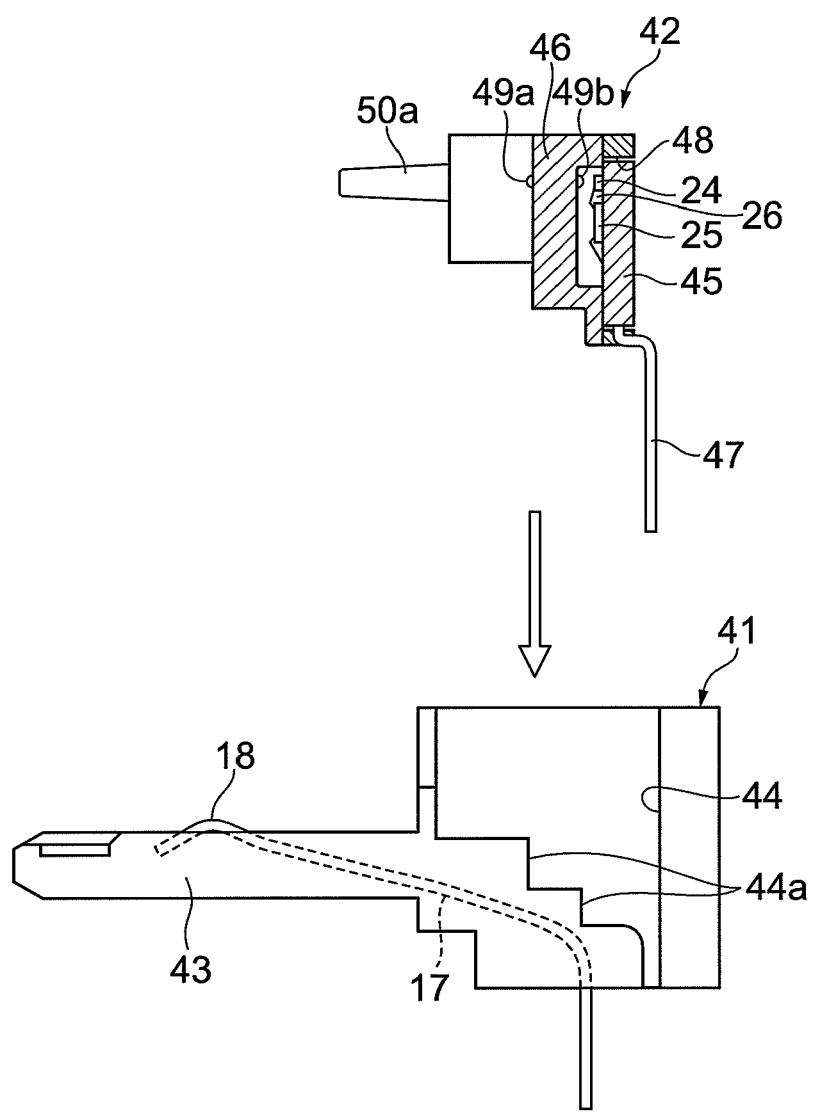
FIG. 16 is a drawing for explaining an assembling procedure of the receptacle shown in FIG. 11.

The fourth embodiment will be described below. FIG. 11 is a drawing showing a state in which the receptacle and the USB connector according to the fourth embodiment are coupled, FIG. 12 is a perspective view showing the appearance of the receptacle shown in FIG. 11, FIG. 13 is a top plan view of the receptacle shown in FIG. 11, FIG. 14 is a front view of the receptacle shown in FIG. 11, FIG. 15 is a side view of the receptacle shown in FIG. 11, and FIG. 16 is a drawing for explaining an assembling procedure of the receptacle shown in FIG. 11. FIGS. 12 to 14 are drawn without illustration of metal shell 11, for convenience' sake of description.

As shown in each drawing, the receptacle 40 is provided with a main body part 41 and an optical device part (OSA: Optical Sub Assembly) 42. The main body part 41 is made of an insulating material. The main body part 41 has a protruding portion 43 and a housing portion 44. The protruding portion 43 is provided so as to protrude forward from the housing portion 44, in the main body part 41, and is of a flat plate shape. In the protruding portion 43 there are a plurality of embedded conductors (four conductors herein; connection conductors) 17 for electric signals, power, and power ground. As shown in FIG. 15, one ends of the conductors 17 are provided so as to be exposed in a surface of the protruding portion 43 at positions where they are to be electrically connected to contact portions (not shown) provided in the USB connector 3, thereby forming connections 18. The other ends of the conductors 17 are bent by about 90° on the rear side of the main body part 41 (the housing portion 44 side) to be drawn out downward from the main body part 41. The other ends of the conductors 17 are to be electrically connected to a printed circuit board (not shown). The housing portion 44 is provided on the rear side of the main body part 41. The housing portion 44 is a portion that houses the optical device part 42, and there are a plurality of steps 44a formed therein.

The optical device part 42 is composed of a substrate 45 and a lens case 46. The substrate 45 is, for example, a printed wiring board. The substrate 45 has a rectangular shape and has the outside dimensions to fit in a receiving portion 48 of the lens case 46. There are a light emitting device 23, a light receiving device 24, and an IC chip 25 mounted on the substrate 45. The light emitting device 23 and the light receiving device 24 are connected through wires 26 to the IC chip 25. The light emitting device 23 to be used herein can be, for example, a vertical cavity surface emitting laser (VCSEL: Vertical Cavity Surface Emitting LASER). The light receiving device 24 to be used herein can be a photodiode (PD: Photodiode).

The IC chip 25 has functions to control the light emitting device 23 and the light receiving device 24 and other functions, e.g., such functions as a driver to drive the light emitting device 23, a transimpedance amplifier (TIA: Translmpedance Amplifier) to output a voltage signal according to a light signal received by the light receiving device 24, a limiting amplifier (LA: Limiting Amplifier), and so on. The IC chip 25 is controlled by the device on which the receptacle 40 is mounted.

A flexible wiring board (rigid flex: conductive member) 47 for connection between the optical device part 42 and the printed circuit board is connected to the lower end side of the substrate 45. Specifically, the flexible wiring board 47 is provided, for example, with wires for signal lines, for power, for ground (earth), and for control of the IC chip 25. The flexible wiring board 47 is electrically connected to the substrate 45.

The lens case 46 has a configuration to cover the substrate 45 on which the light emitting device 23, light receiving device 24, IC chip 25, etc. are mounted. The lens case 46 is made of a transparent resin with transparency, e.g., polyetherimide (PEI), polycarbonate (PC), or acrylic resin. Furthermore, it is preferable to use an electron beam cross-linked resin. When the electron beam cross-linked resin is used, the lens case 46 can have sufficient reflow heat resistance and can be mounted simultaneously with general electronic components. The contour of the lens case 46 is a shape corresponding to the steps 44a of the housing portion 44. The receiving portion 48 for receiving the substrate 45 is formed in the lens case 46. The lens case 46 is provided with an aperture, and the substrate 45 is arranged in an upright state over this aperture portion. This arrangement makes the back side of the lens case 46 and the substrate 45 approximately flush with each other.

As shown in FIG. 13, lens portions 49a, 49b for collimating light emitted from the light emitting device 23 are formed in a spherical convex shape at respective positions opposite to the light emitting device 23 on a front face F1 (surface on the side where the USB connector 3 is located) and a rear face F2 (surface on the light emitting device 23 side) of the lens case 46. Namely, the lens portions 49a, 49b are arranged between the ferrule 4 and the light emitting device 23. Lens portions 49c, 49d for collimating light to enter the light receiving device 24 are formed in a spherical convex shape at respective positions opposite to the light receiving device 24 on the front face F1 and the rear face F2 of the lens case 46. Namely, the lens portions 49c, 49d are arranged between the ferrule 4 and the light receiving device 24.

The lens case 46 has guide pins 50a, 50b. The lens case 46, as shown in FIG. 13, is of a recessed shape on the top plan view and the guide pins 50a, 50b are provided so as to project forward from front end faces 46a, 46b of the recessed shape. The guide pins 50a, 50b are formed so as to be tapered from the base end on the front end face 46a, 46b side toward the distal end. The guide pins 50a, 50b are inserted into guide grooves (not shown) formed in the plug 5 of the USB connector 3. This operation results in aligning the optical axes between the ferrule 4 and the light emitting device 23 and between the ferrule 4 and the light receiving device 24.

The receptacle 40 having the above configuration is constructed, as shown in FIG. 16, by first assembling the optical device part 42 and thereafter putting this optical device part 42 into the housing portion 44 of the main body part 41. On this occasion, the optical device part 42 is arranged in the housing portion 44 of the main body part 41 by such positioning that the steps 44a formed in the housing portion 44 fit with the steps of the optical device part 42. Then the main body part 41 with the optical device part 42 thereon is inserted into the metal shell 11, thereby completing the receptacle 40.

The operation with the USB connector 3 being coupled to the aforementioned receptacle 40 will be described below with reference to FIG. 11. In FIG. 11, the conductor wires of the USB cable 2 are in contact with the connections 18 of the receptacle 40 to achieve connections (metal contacts) between the conductors. For example, output light from the light emitting device 23 of the receptacle 40 is collimated by the lens portions 49a, 49b of the lens case 46 to enter the lens 4a of the ferrule 4. On the other hand, output light from the ferrule 4 is also collimated similarly by the lens portions 49c, 49d of the lens case 46 to enter the light receiving device 24. In this manner, the optical coupling is also achieved at the same time as the conductor coupling.

As described above, the receptacle 40 is provided with the connections 18 to be connected to the conductor wires of the USB cable 2, the light emitting device 23 to emit light toward the ferrule 4, and the light receiving device 24 to receive light emitted from the ferrule 4. This allows the receptacle 40 to be compatible with the USB cable 2 adapted for the optical coupling while including the optical cords, in addition to the conductor coupling. As a consequence, it is feasible to achieve large-volume data communication at high speed.

Since the lens portions 49a-49d for collimating light are provided at the positions opposite to the light emitting device 23 and the light receiving device 24, the light beam emitted from the light emitting device 23 and the light beam received by the light receiving device 24 are collimated by the lens portions 49a-49d, which ensures surer optical coupling.

The receptacle is provided with the lens case 46 having the receiving portion 48 receiving the light emitting device 23 and the light receiving device 24, and the lens portions 49a-49d are provided at the positions opposite to the light emitting device 23 and the light receiving device 24 on the lens case 46. This configuration allows the light emitting device 23 and the light receiving device 24 to be protected by the lens case 46.

[Fifth Embodiment]

Figure 17:
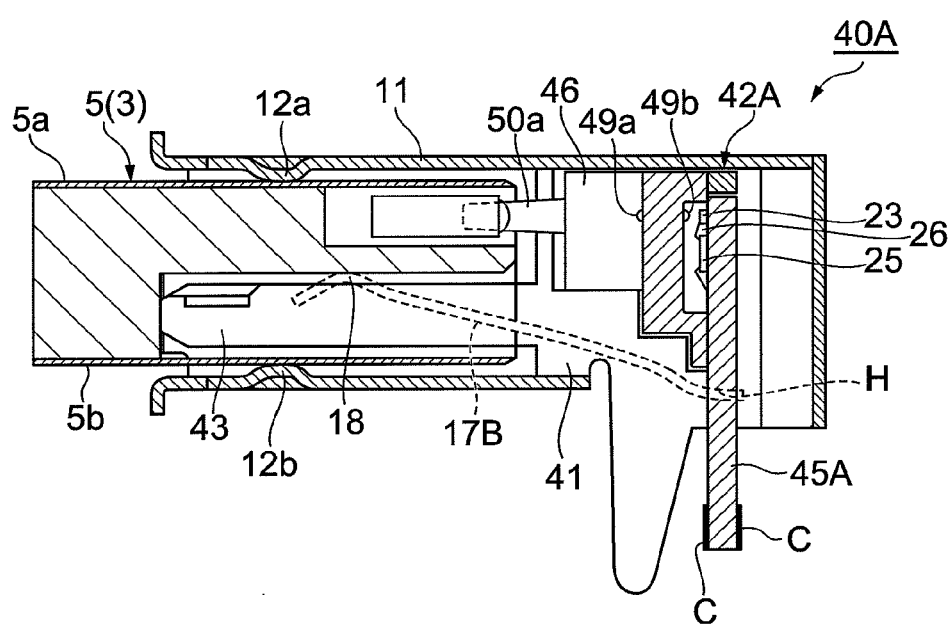
FIG. 17 is a side cross-sectional view of a receptacle according to the fifth embodiment.

The fifth embodiment will be described below. FIG. 17 is a side cross-sectional view of the receptacle according to the fifth embodiment. As shown in FIG. 17, the receptacle 40A of the fifth embodiment is provided with a main body part 41 and an optical device part 42A. The main body part 41 has the same configuration as in the first embodiment.

The optical device part 42A is composed of a substrate 45A and a lens case 46, and the lens case 46 has the same configuration as in the fourth embodiment. There are a light emitting device 23, a light receiving device 24, and an IC chip 25 mounted on the substrate 45A. The substrate 45A has a larger length than the substrate 45 of the fourth embodiment and the lower end of the substrate 45A projects out of the metal shell 11. Contacts (connections) C to be inserted into an edge connector socket (not shown) are formed at the lower end of the substrate 45A. In this configuration, the substrate 45A serves as an edge connector.

The conductors 17B are inserted into respective through holes H formed in the substrate 45A on the rear end side of the main body part 4, so as to be electrically connected to the substrate 45A. In the receptacle 40A, therefore, terminals to be connected to a printed circuit board are only the contacts C of the substrate 45A.

As described above, the receptacle 40A is provided with the connections 18 to be connected to the conductor wires of the USB cable 2, the light emitting device 23 to emit light toward the ferrule 4, and the light receiving device 24 to receive light emitted from the ferrule 4. Then the conductor wires are connected by conductor coupling to the connections 18 and the optical fibers in the USB cable 2 are connected by optical coupling to the light emitting device 23 and the light receiving device 24. This allows the receptacle 40A to be compatible with the USB cable 2 adapted for the optical coupling while including the optical cords, in addition to the conductor coupling. As a consequence, it is feasible to achieve large-volume data communication at high speed.

Since in the receptacle 40A the substrate 45A has the contacts C to be inserted into the edge connector socket and constitutes the edge connector, faster transmission can be achieved when compared with the case where the receptacle is mounted through the conductors 17B and terminals (pins) on the printed circuit board.

[Sixth Embodiment]

Figure 18:
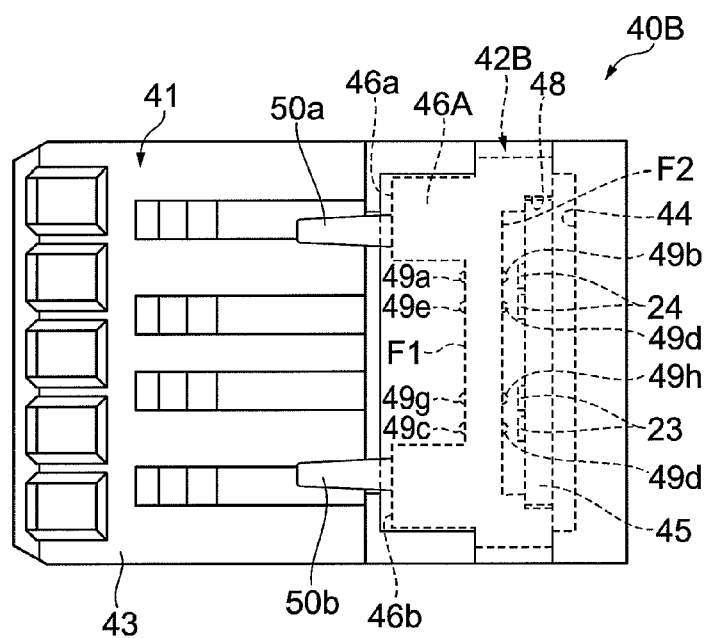
FIG. 18 is a top plan view of a receptacle according to the sixth embodiment.

The sixth embodiment will be described below. FIG. 18 is a top plan view of the receptacle according to the sixth embodiment. As shown in the same drawing, the receptacle 40B is different from the fifth embodiment in that it is further provided with lens portions 49e-49h, but the other basic configuration is the same as in the fifth embodiment.

An optical device part 42B of the receptacle 40B is provided with a plurality of lens portions (eight lens portions herein) 49a-49h. Specifically, the lens portions 49a-49h are arranged in juxtaposition in the longitudinal direction of the lens case 46A. The lens portions 49a-49h, as in the fifth embodiment, are formed in a spherical convex shape at respective positions opposite to the light emitting device 23 and the light receiving device 24 on the front face F1 and the rear face F2 of the lens case 46A. Namely, there are two light emitting devices 23 and two light receiving devices 24 mounted on the substrate 45B.

As described above, the receptacle 40B is provided with the connections 18 to be connected to the conductor wires of the USB cable 2, the light emitting devices 23 to emit light toward the ferrule 4, and the light receiving devices 24 to receive light emitted from the ferrule 4. Then the conductor wires are connected by conductor coupling to the connections 18 and the optical fibers in the USB cable 2 are connected by optical coupling to the light emitting devices 23 and the light receiving devices 24. This allows the receptacle 40B to be compatible with the USB cable 2 adapted for the optical coupling while including the optical cords, in addition to the conductor coupling. As a consequence, it is feasible to achieve large-volume data communication at high speed.

The configuration with the lens portions 49a-49h allows the receptacle 40B to be also compatible with the case where the USB cable 2 includes four optical cords. It is noted that the configuration of the receptacle 40B of the sixth embodiment is also applicable to the receptacle 40A of the fifth embodiment.

[Seventh Embodiment]

Figure 19:
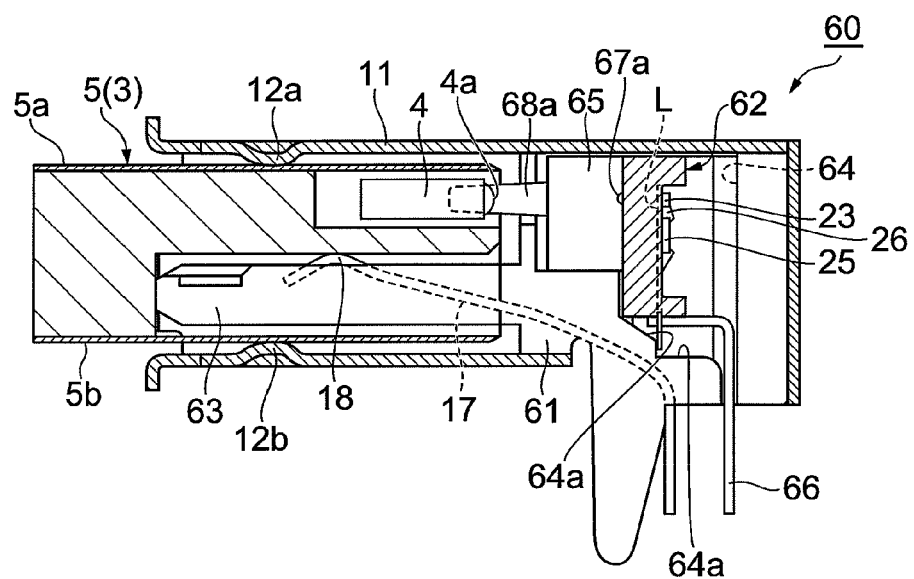
FIG. 19 is a side cross-sectional view showing a state in which a receptacle and a USB connector according to the seventh embodiment are coupled.
Figure 20:
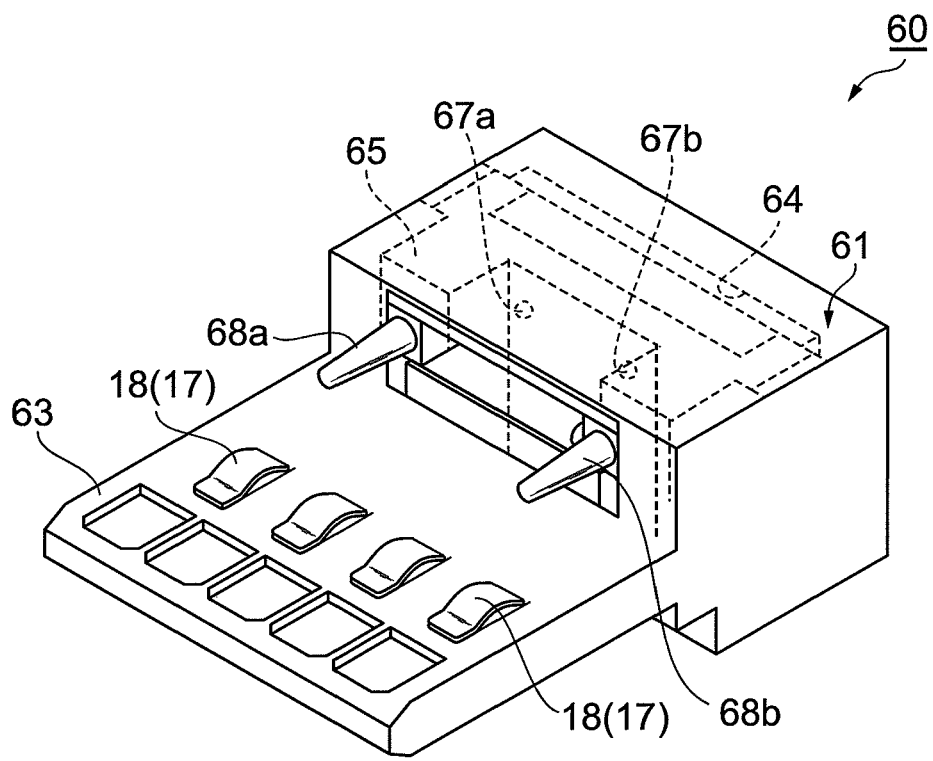
FIG. 20 is a perspective view of the receptacle shown in FIG. 19.

The seventh embodiment will be described below. FIG. 19 is a side cross-sectional view showing a state in which the receptacle and USB connector according to the seventh embodiment are coupled, FIG. 20 a perspective view of the receptacle shown in FIG. 19, FIG. 21 a top plan view of the receptacle shown in FIG. 19, FIG. 22 a front view of the receptacle shown in FIG. 19, FIG. 23 a side view of the receptacle shown in FIG. 19, and FIG. 24 a drawing for explaining an assembling procedure of the receptacle shown in FIG. 19. FIGS. 20 to 24 are drawn without illustration of the metal shell 11, for convenience' sake of description.

As shown in each drawing, the receptacle 60 is provided with a main body part 61 and an optical device part (OSA: Optical Sub Assembly) 62. The main body part 61 is made of an insulating material. The main body part 61 has a protruding portion 63 and a housing portion 64. The protruding portion 63 is provided so as to protrude forward from the housing portion 64 in the main body part 61, and is of a flat plate shape. In the protruding portion 63 there are a plurality of embedded conductors (four conductors herein; connection conductors) 17 for electric signals, power, and power ground. As shown in FIG. 19, one ends of the conductors 17 are provided so as to be exposed in a surface of the protruding portion 63 at positions where they are to be electrically connected to contacts (not shown) provided in the USB connector 3, thereby forming the connections 18. The other ends of the conductors 17 are bent by about 90° on the rear side of the main body part 61 (the housing portion 64 side) to be drawn out downward from the main body part 61. The other ends of the conductors 17 are electrically connected to a printed circuit board (not shown). The housing portion 64 is provided on the rear side of the main body part 61. The housing portion 64 is a portion that houses the optical device part 62, and a plurality of steps 64a are formed therein.

The optical device part 62 is provided with a lens case 65. The lens case 65 is made of a transparent resin with transparency, e.g., polyetherimide (PEI), polycarbonate (PC), or acrylic resin. Furthermore, it is preferable to use an electron beam cross-linked resin. When the electron beam cross-linked resin is used, the lens case 65 can have sufficient reflow heat resistance and can be mounted simultaneously with general electronic components. There are a light emitting device 23, a light receiving device 24, and an IC chip 2 mounted on the lens case 65. Specifically, the lens case 65 includes conductors (conductive members) L and the light emitting device 23, light receiving device 24, and IC chip 25 are connected to the conductors L. The light emitting device 23 and the light receiving device 24 are connected through wires 26 to the IC chip 25. The light emitting device 23 to be used herein can be, for example, a vertical cavity surface emitting laser (VCSEL: Vertical Cavity Surface Emitting LASER). The light receiving device 24 to be used herein can be a photodiode (PD: Photodiode).

The IC chip 25 has functions to control the light emitting device 23 and the light receiving device 24 and other functions, e.g., such functions as a driver to drive the light emitting device 23, a transimpedance amplifier (TIA: TransImpedance Amplifier) to output a voltage signal according to a light signal received by the light receiving device 24, a limiting amplifier (LA: Limiting Amplifier), and so on. The IC chip 25 is controlled by the device on which the receptacle 60 is mounted.

A flexible wiring board (rigid flex: connection member) 66 for connection between the optical device part 62 and the printed circuit board is connected to the lens case 65. Specifically, the flexible wiring board 66 is provided, for example, with wires for signal lines, for power, for ground (earth), and for control of the IC chip 25. The flexible wiring board 66 is electrically connected to the conductors L included in the lens case 65.

A lens portion 67a for collimating light emitted from the light emitting device 23 is formed in a spherical convex shape at a position opposite to the light emitting device 23 on a front face F1 of the lens case 65 (a surface on the side where the USB connector 3 is located). Namely, the lens portion 67a is arranged between the ferrule 4 and the light emitting device 23. A lens portion 67b for collimating light to be received by the light receiving device 24 is formed in a spherical convex shape at a position opposite to the light receiving device 24 on the front face F1 of the lens case 65. Namely, the lens portion 67b is arranged between the ferrule 4 and the light receiving device 24.

Figure 21:
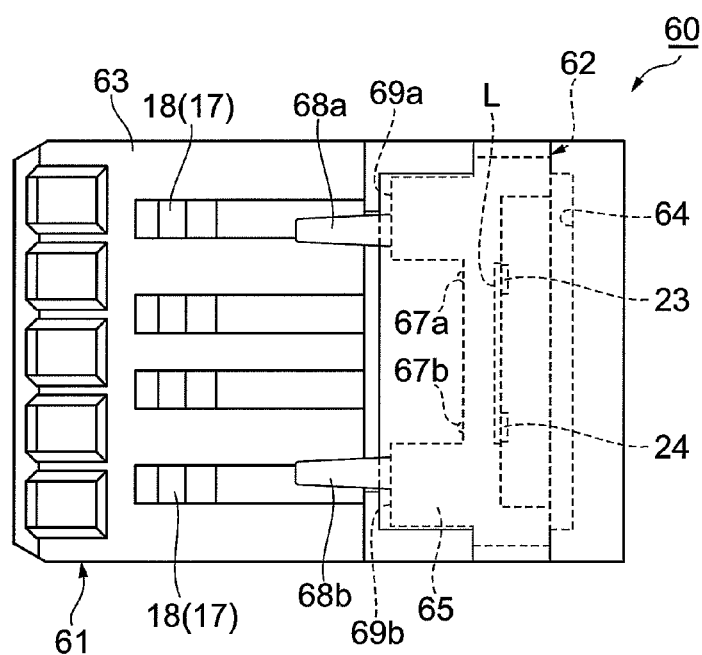
FIG. 21 is a top plan view of the receptacle shown in FIG. 19.
Figure 22:
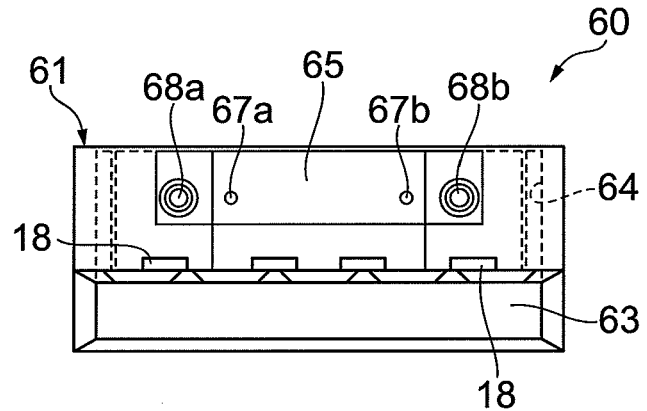
FIG. 22 is a front view of the receptacle shown in FIG. 19.
Figure 23:
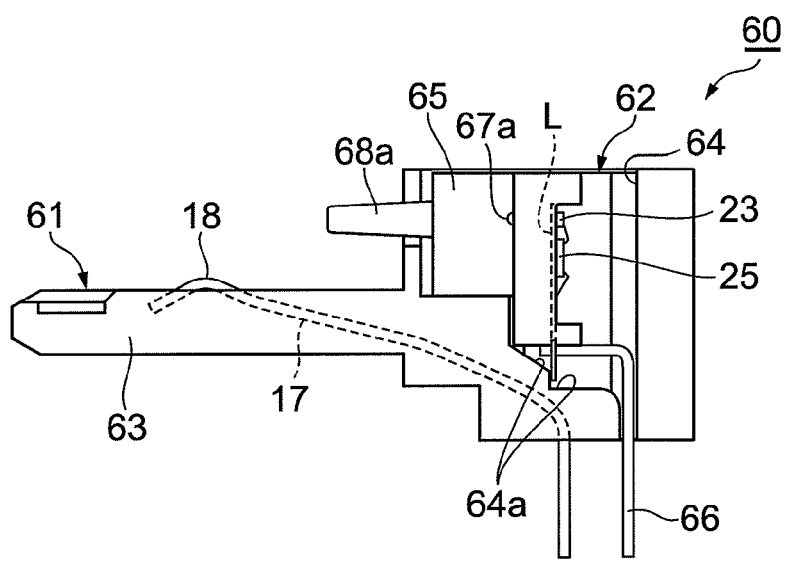
FIG. 23 is a side view of the receptacle shown in FIG. 19.

The lens case 65 has guide pins 68a, 68b. The lens case 65 is of a recessed shape on the top plan view, as shown in FIG. 21, and the guide pins 68a, 68b are provided so as to project forward from front end faces 69a, 69b of the recessed shape. The guide pins 68a, 68b are formed so as to be tapered from the base end on the front end face 69a, 69b side toward the distal end. The guide pins 68a, 68b are inserted into guide grooves (not shown) formed in the plug 5 of the USB connector 3. This operation results in aligning the optical axes between the ferrule 4 and the light emitting device 23 and between the ferrule 4 and the light receiving device 24.

Figure 24:
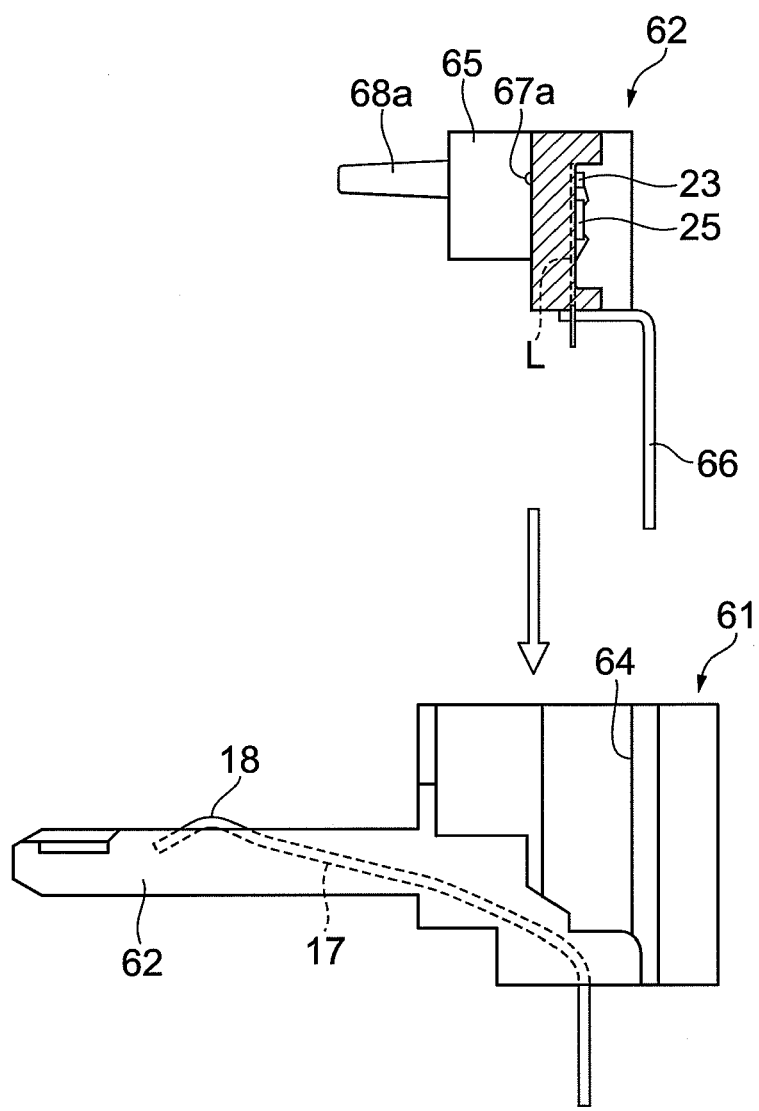
FIG. 24 is a drawing for explaining an assembling procedure of the receptacle shown in FIG. 19.

The receptacle 60 having the above configuration is constructed, as shown in FIG. 24, by first assembling the optical device part 62 and thereafter putting this optical device part 62 into the housing portion 64 of the main body part 61. On this occasion, the optical device part 62 is arranged in the housing portion 64 of the main body part 61 by such positioning that the steps of the optical device part 62 fit with the steps 64a formed in the housing portion 64. Then the main body part 61 with the optical device part 62 thereon is inserted into the metal shell 11, thereby completing the receptacle 60.

The operation with the USB connector 3 being coupled to the above receptacle 60 will be described below with reference to FIG. 19. In FIG. 19, the conductor wires of the USB cable 2 are in contact with the connections 18 of the receptacle 60 to achieve connections (metal contacts) between the conductors. For example, output light from the light emitting device 23 of the receptacle 60 is collimated by the lens portion 67a of the lens case 65 to enter the lens 4a of the ferrule 4. On the other hand, output light from the ferrule 4 is also collimated similarly by the lens portion 67b of the lens case 65 to enter the light receiving device 24. In this manner, the optical coupling is also achieved at the same time as the conductor coupling.

As described above, the receptacle 60 is provided with the connections 18 to be connected to the conductor wires of the USB cable 2, the light emitting device 23 to emit light toward the ferrule 4, and the light receiving device 24 to receive light emitted from the ferrule 4. Then the conductor wires are connected by conductor coupling to the connections 18 and the optical fibers in the USB cable 2 are connected by optical coupling to the light emitting device 23 and the light receiving device 24. This allows the receptacle 60 to be compatible with the USB cable 2 adapted for the optical coupling while including the optical cords, in addition to the conductor coupling. As a consequence, it is feasible to achieve large-volume data communication at high speed.

Since the lens portions 67a, 67b for collimating light are provided at the positions opposite to the light emitting device 23 and the light receiving device 24, the light beam emitted from the light emitting device 23 and the light beam received by the light receiving device 24 are collimated by the lens portions 67a, 67b, which ensures surer optical coupling.

Since the conductors L are included in the lens case 65 and the light emitting device 23, light receiving device 24, and IC chip 25 are connected to the conductors L, the optical device part 62 can be downsized.

[Eighth Embodiment]

Figure 25:
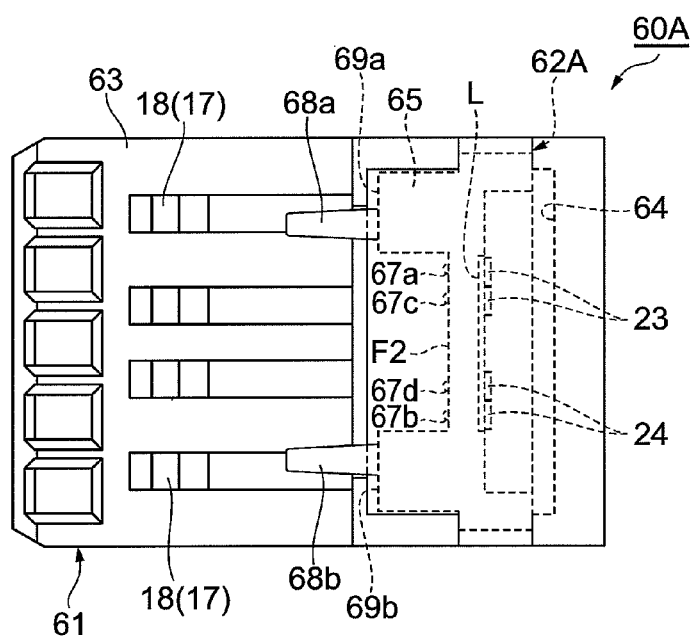
FIG. 25 is a top plan view of a receptacle according to the eighth embodiment.

The eighth embodiment will be described below. FIG. 25 is a top plan view of the receptacle according to the eighth embodiment. As shown in FIG. 25, the receptacle 60A of the eighth embodiment is different from the receptacle 60 of the seventh embodiment in that it is further provided with lens portions 67c, 67d, but the other basic configuration is the same as in the seventh embodiment.

As shown in FIG. 25, the receptacle 60A is provided with a plurality of lens portions (four lens portions herein) 67a-67d. Specifically, the lens portions 67a-67d are arranged along the longitudinal direction of lens case 65A. The lens portions 67a-67d, as in the seventh embodiment, are formed in a spherical convex shape at the positions opposite to the light emitting devices 23 and the light receiving devices 24 on the front face F1 of the lens case 65A. Namely, there are two light emitting devices 23 and two light receiving devices 24 mounted on the lens case 65A.

As described above, the receptacle 60A is provided with the connections 18 to be connected to the conductor wires of the USB cable 2, the light emitting devices 23 to emit light toward the ferrule 4, and the light receiving devices 24 to receive light emitted from the ferrule 4. Then the conductor wires are connected by conductor coupling to the connections 18 and the optical fibers in the USB cable 2 are connected by optical coupling to the light emitting devices 23 and the light receiving devices 24. This allows the receptacle 60A to be compatible with the USB cable 2 adapted for the optical coupling while including the optical cords, in addition to the conductor coupling. As a consequence, it is feasible to achieve large-volume data communication at high speed.

The configuration with the lens portions 67*a*-67*d* permits the receptacle 60A to be also compatible with the case where the USB cable 2 includes four optical cables. It is noted that the configuration of the receptacle 60A of the eighth embodiment is also applicable to the receptacle 60 of the seventh embodiment.

What is claimed is:

1. A connector component to be coupled to a connector incorporating a plurality of conductor wires, and a ferrule holding distal ends of optical fibers, the connector component comprising:
   connections to be connected to the plurality of conductor wires;
   a light emitting device to emit light toward the ferrule;
   a light receiving device to receive light emitted from the ferrule;
   a substrate on which the light emitting device and the light receiving device are mounted; and
   a member connecting the substrate and a mounting substrate,
   wherein the member extends in a vertical direction with respect to an optical axis of an optical coupling of the connector,
   wherein the plurality of conductor wires are connected by conductor coupling to the connections, and the optical fibers are connected by optical coupling to the light emitting device and the light receiving device, and
   wherein the substrate is connected to the mounting substrate along a perpendicular direction.

2. The connector component according to claim 1, comprising lenses for collimating light, at positions opposite to the light emitting device and the light receiving device.

3. The connector component according to claim 2, comprising a mirror for reflecting light, at a position opposite to the lenses,
   wherein the mirror reflects the light emitted from the light emitting device and collimated by the lens, toward the ferrule and reflects the light emitted from the ferrule, toward the light receiving device.

4. The connector component according to claim 2, comprising a lens case with a receiving portion forming a receiving space to receive the light emitting device and the light receiving device,
   wherein the lenses are provided at the positions opposite to the light emitting device and the light receiving device on the lens case.

5. The connector component according to claim 4, wherein the lens case is provided with a guide pin to be inserted into the connector and to implement optical-axis alignment of the light emitting device and the light receiving device with the ferrule.

6. The connector component according to claim 1, wherein the light emitting device and the light receiving device are arranged at respective positions opposite to the ferrule.

7. The connector component according to claim 6, comprising lenses for collimating light, between the light emitting device and the ferrule and between the light receiving device and the ferrule.

8. The connector component according to claim 7, comprising a lens case on which the light emitting device and the light receiving device are mounted,
   wherein the lenses are provided between the light emitting device and the ferrule and between the light receiving device and the ferrule on the lens case.

9. The connector component according to claim 8, comprising a conductive member to which the light emitting device and the light receiving device are connected and which is embedded in the lens case,
   wherein a connection member to be electrically connected to a printed circuit board is connected to the conductive member.

10. The connector component according to claim 8, wherein the lens case is provided with a guide pin to be inserted into the connector and to implement optical-axis alignment of the light emitting device and the light receiving device with the ferrule.

11. The connector component according to claim 7, comprising a lens case with a receiving portion to receive the light emitting device and the light receiving device,
    wherein the lenses are provided between the light emitting device and the ferrule and between the light receiving device and the ferrule on the lens case.

12. The connector component according to claim 11, wherein the lens case is provided with a guide pin to be inserted into the connector and to implement optical-axis alignment of the light emitting device and the light receiving device with the ferrule.

13. The connector component according to claim 1, wherein a conductive member to be electrically connected to a printed circuit board is connected to the substrate.

14. The connector component according to claim 1, wherein the substrate has a connection portion to which the connections to be electrically connected to the conductor wires are connected and which is to be directly connected to a printed circuit board.

15. The connector component according to claim 1, wherein the vertical direction is perpendicular to the optical axis of the optical coupling of the connector.

16. The connector component according to claim 1, wherein the substrate is connected to extend perpendicularly from the mounting substrate.

17. The connector component according to claim 1, wherein the substrate and the mounting substrate are perpendicular to each other.

* * * * *